United States Patent [19]
Zachary et al.

[11] Patent Number: 5,458,294
[45] Date of Patent: Oct. 17, 1995

[54] CONTROL SYSTEM FOR CONTROLLING GAS FUEL FLOW

[75] Inventors: Justin J. Zachary; Larry J. Honn; Gerry C. Wolter, all of Cincinnati, Ohio

[73] Assignee: G & L Development, Inc., Cincinnati, Ohio

[21] Appl. No.: 222,488

[22] Filed: Apr. 4, 1994

[51] Int. Cl.[6] .............................. B05B 1/32; F02M 51/06
[52] U.S. Cl. .............................. 239/585.5; 239/75; 431/80
[58] Field of Search .................................. 236/75, 20 R; 239/585.1–585.5, 5, 63, 75; 431/78–81

[56] References Cited

U.S. PATENT DOCUMENTS

| | | | |
|---|---|---|---|
| 975,482 | 11/1910 | Tucker | 239/390 X |
| 2,283,496 | 5/1942 | Fehrenbach | 431/79 X |
| 2,513,720 | 7/1950 | Hallinan | 239/75 |
| 3,022,987 | 2/1962 | Thorsheim | 239/75 X |
| 3,232,537 | 2/1966 | Jaramillo et al. | 239/75 |
| 4,608,208 | 8/1986 | Yogo et al. | 236/75 X |
| 4,621,771 | 11/1986 | Chiba et al. | 239/585.4 |

*Primary Examiner*—David M. Mitchell
*Assistant Examiner*—Kevin P. Weldon
*Attorney, Agent, or Firm*—Barbara Joan Haushalter

[57] ABSTRACT

An apparatus for accurately controlling gas fuel flow to a combustion device is provided to control gas flow to a burner of the combustion device. A variable orifice solenoid operated valve serves as a control element. The valve includes a poppet having a fixed control surface at an end received in an insert element having a variable control surface. The poppet has a plurality of positions within the insert element, including a full open position and a full closed position. Maximum fuel flow is measured in the full open position and minimum fuel flow is measured in the full closed position. Intermediate partially open positions are adjustable by a signal of an electronic controller connected to the solenoid valve operating as a function of actual and desired temperature of the combustion device.

7 Claims, 2 Drawing Sheets

CONTROL SYSTEM FOR CONTROLLING GAS FUEL FLOW

BACKGROUND OF THE INVENTION

The present invention relates to gas fuel for combustion devices and, more particularly, to a control system for controlling gas fuel flow to a combustion device to maintain a desired temperature.

Typically, most buildings, both houses and commercial, are built with various combustion devices for domestic hot water, interior heat, and other gas fired appliances. These devices include energy conversion units and distribution systems, often tank type storage units, namely gas or oil burners or electric elements; sets of controls, namely thermostats, thermocouples, electric valves and regulators; hot water storage tanks and heat exchangers; and conduits for transferring the heated water and air.

Most existing combustion devices heat water or air to or just greater than a desired temperature. The system then turns off for a period of time, until the water or air cools to a predetermined temperature below the desired temperature. The system then restarts and again heats the water or air.

Obviously, several problems and potential problems exist with such systems. For instance, turning the combustion device on and off can be expensive and inefficient. Additionally, wide fluctuations can occur in the gas fuel flow according to the demands on the system. Obviously, poor control of fuel flow can create negative responses from users, from mild annoyance to actual safety hazards. Additionally, on/off burner operation causes thermal shock to heat exchangers and combustion chambers, reducing the life of those parts.

It is seen then that there exists a need for a system and method for controlling gas fuel flow to a combustion device to maintain a desired water or air temperature, which overcomes the problems associated with existing systems which fluctuate up and down to keep achieving the desired temperature.

SUMMARY OF THE INVENTION

This need is met by the device according to the present invention wherein gas fuel flow is measured as a function of specific parameters of a combustion device. The instant invention is directed to a variable orifice solenoid operated valve, serving as a control element, which meters the minimum gas fuel flow in its closed position and the maximum gas fuel flow in its open position. The minimum and maximum flow values, as well as intermediate values between minimum and maximum flow, are adjustable by a signal of an electronic controller connected to the solenoid valve operating as a function of the sensed or actual temperature and the desired temperature.

In accordance with one aspect of the present invention, an apparatus for accurately metering gas fuel flow to a combustion device controls gas flow in the device. The control apparatus comprises a variable orifice solenoid operated valve having a plurality of positions, including a full open position and a full closed position. Maximum fuel flow is measured in the full open position and minimum fuel flow is measured in the full closed position. Intermediate partially open positions are adjustable by a signal of an electronic controller connected to the solenoid valve operating as a function of the sensed temperature as compared to the desired temperature.

Accordingly, it is an object of the present invention to provide an apparatus and method for accurately controlling gas flow to a combustion device. Other objects and advantages of the invention will be apparent from the following description, the accompanying drawings and the appended claims.

DETAILED DESCRIPTION OF THE PREFERRED EMBODIMENTS

The gas fuel flow control system according to the present invention meters gas fuel flow in a combustion device. The gas fuel flow control system meters gas fuel flow as a function of the measured or actual air or water temperature and the desired air or water temperature in order to maintain the desired temperature.

Figure 1:
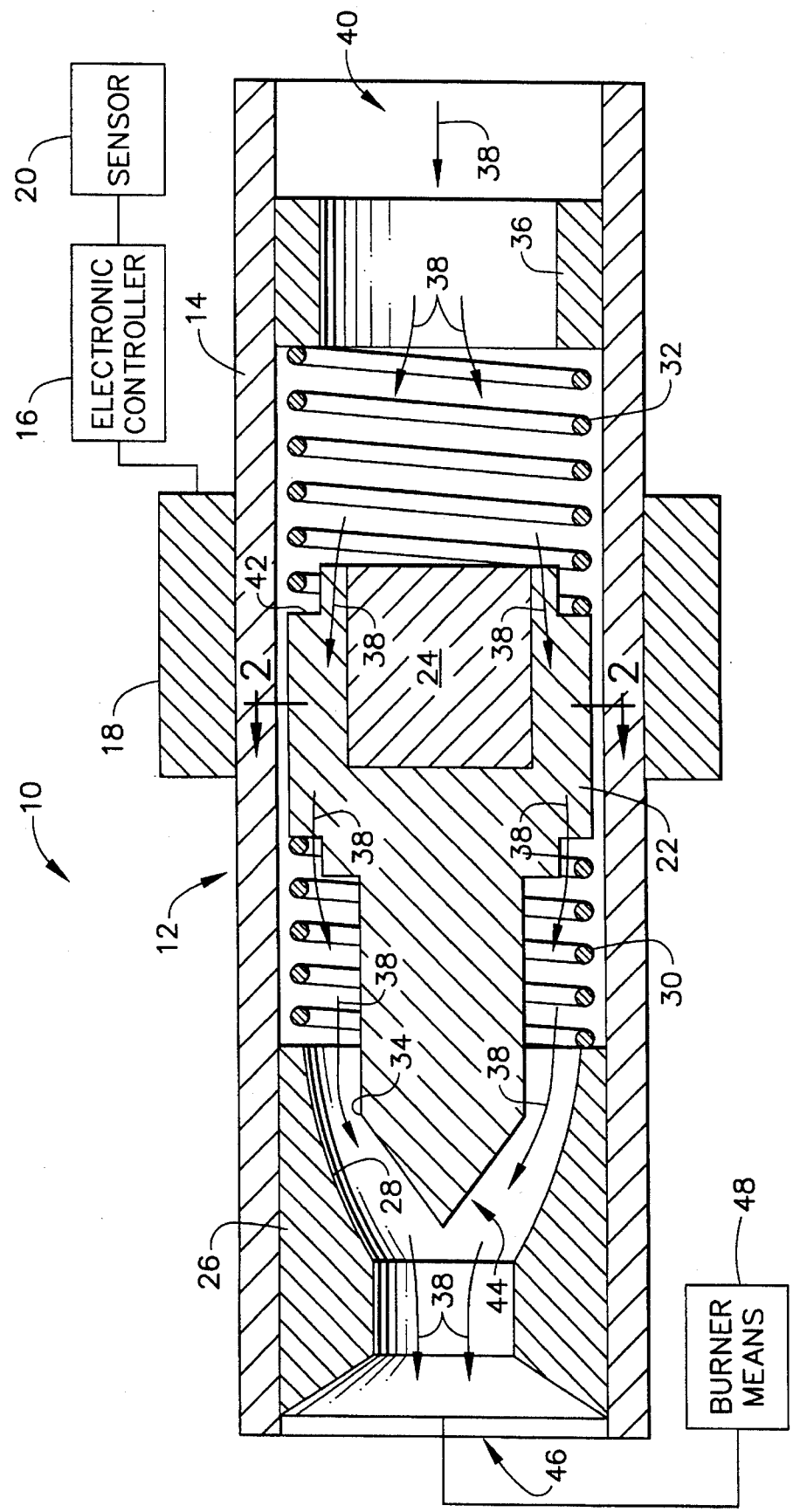
FIG. 1 is a cutaway side view illustrating the gas fuel flow metering or control apparatus according to the present invention.

Referring now to the drawings, in FIG. 1 there is illustrated a cutaway side view illustrating the components comprising a gas fuel flow control apparatus 10 in accordance with the present invention. The apparatus comprises a variable orifice solenoid operated valve 12 having a valve body 14. The valve 12 serves as a control element and has a plurality of positions. Maximum fuel flow is measured when the valve 12 is in a full open position and minimum fuel flow is measured when the valve 12 is in a full closed position. Intermediate partially open positions are adjustable by a signal of an electronic controller 16 connected to the solenoid valve 12 at an associated solenoid coil 18.

The electronic controller 16 is any suitable unit, preferably a proportional integral derivative (PID) device. Classical control methods are applied to the PID such that the necessary portions of the PID are manipulated to react to changes in a system to control one or more parameters, i.e., temperature, and maintain a desired temperature value. The PID is equipped with any of a multitude of commercially available microchips, such as, for example, a Motorola 6805, that is capable of processing an input from a temperature sensing device 20, such as a thermistor. The microchip is specifically designed for each application to command the controller 16 to apply a voltage to the coil 18. The amount of voltage applied is directly proportional to the amount of axial movement of poppet 22 associated with the valve 12. A larger voltage causes a magnetic field of greater intensity, which causes greater axial movement of poppet 22.

Continuing with FIG. 1, the orifice valve 12 is electrically operated. Specifically, the electronic controller unit 16 sends a voltage to coil 18, depending on the temperature being sensed by sensor 20, and the temperature desired. The magnetic field created by the coil 18 interacts with a permanent magnet 24. The magnet 24 is attached, such as by suitable mechanical means, to a poppet 22 to cause the poppet to move axially forward. As the poppet moves axially forward into an insert element 26, the size of the area between the poppet 22 and a variable control surface, or metering surface, 28 of insert element 26 is reduced. Therefore, the amount of gas which flows through valve body 14, the body being proportional to the size of the opening, is also reduced. In this manner, then, gas flow can be controlled.

Continuing with FIG. 1, a change in voltage in the coil 18 results in a change in the amount of gas flowing through the valve 12, because a change in voltage in the coil varies the magnetic field between the coil and the magnet which, in turn, varies the forward movement of the poppet into the insert. For instance, in FIG. 1, the poppet 22 is in an intermediate partially open position, approximately three-fourths open. Front and rear springs 30 and 32, respectively, are used to hold the poppet 22 in suspension in the operating range and keep the axial forces in balance due to pressure drop of the gas as the gas flows through the area defined by a fixed control surface 34 of the poppet and the variable control surface 28 of the insert. The rear spring 32 is retained in an anchor position by a retaining ring 36, and the front spring 30 is retained in place by the insert element 26.

Figure 2:
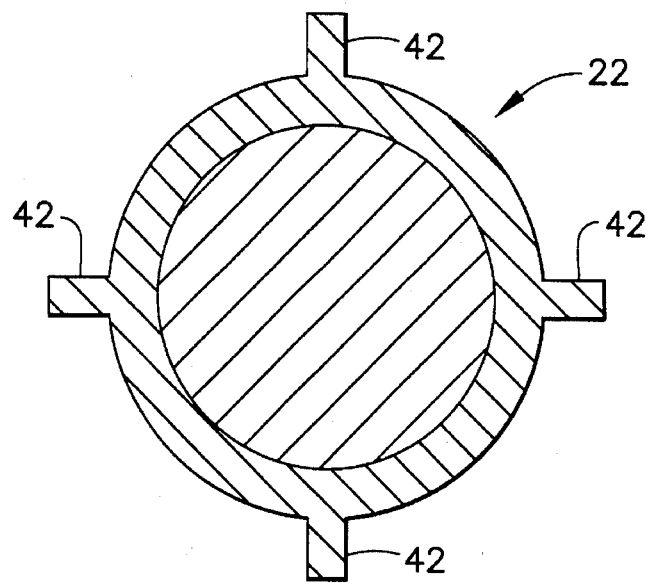
FIG. 2 is an section end view of the metering or control apparatus taken along line 2—2 of FIG. 1.

Referring now to FIG. 2 and continuing with FIG. 1, gas flow from a gas source flows as indicated by arrows 38. The gas flows into valve 12 at an entrance end 40, between fins 42 in poppet 22, between fixed control surface 34 on front end 44 of poppet 22 and variable control surface 28 of insert 26, and out exit end 46 of valve 12, to burner means 48. As the fixed control surface, or metering point, 34 of the poppet moves into the variable control surface 28 area of the insert element, the amount of gas flow changes. If desired, the fixed control surface 34 can contact the variable control surface 28, at some point as the fixed control surface moves into the insert, to completely seal the valve 12 and shut off the flow of gas to the burner means 48. Alternatively, the fixed control surface 34 can be designed to fit through the smallest diameter of the variable control surface 28 to allow a minimum controlled amount of gas flow to the burner means 48, even when the valve is in a closed position.

In an alternative embodiment, which is particularly useful in applications using large valves, a stabilizing rod and rod guide can be employed. For instance, a stabilizing rod can be suitably attached to the front end 44 of poppet 22 to protrude from the very tip of end 44 and through the insert 26. A rod guide can be suitably attached to the end of the insert opposite the entrance end where the poppet enters the insert. The rod guide and the stabilizing rod act to correctly position the poppet in the insert.

Figure 3:
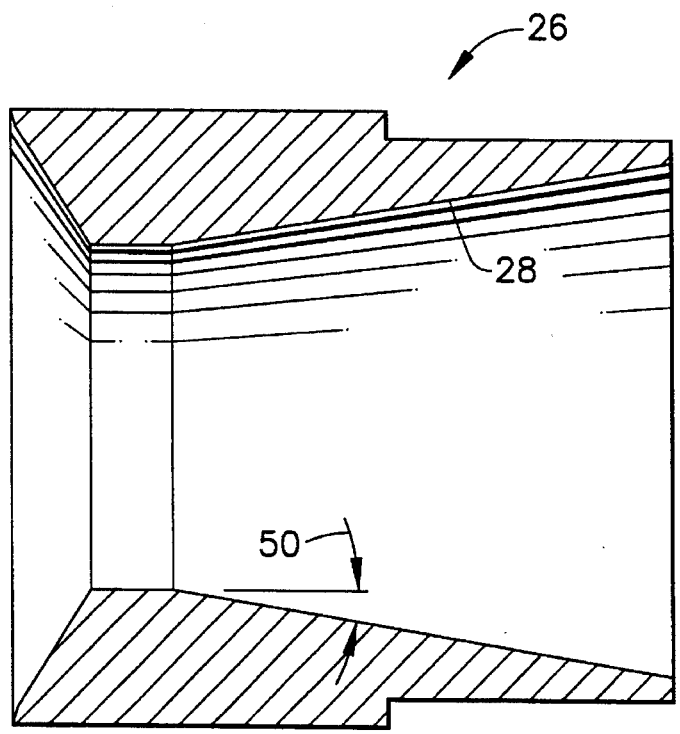
FIG. 3 is a cutaway side view of an insert element of the apparatus of FIG. 1.

Referring now to FIG. 3 and continuing with FIG. 2, a cutaway side view of the insert element 26 is illustrated. The insert element comprises a three dimensional surface for allowing a specific amount of gas flow at a given voltage and for producing a repeatable gas flow as a function of coil voltage. The magnetic field arrangement allows a substantial axial movement of the poppet 22, thereby permitting a large voltage change for a small gas flow change. This provides the advantage of allowing improved and more sensitive control of the gas flow.

Depending on the particular application, angle 50 of conical variable control surface 28 of insert element 26 can be varied to vary the gas flow between the poppet fixed control surface 34 and the insert variable control surface 28. If the angle of the conical variable control surface 28 is long and gradual, the variation in gas flow as the poppet moves into and out of the insert 26 will be minimal. Conversely, if the angle of the conical variable control surface 28 is a large, sharp angle, the variation in gas flow as the poppet moves into and out of the insert 26 will be maximized. The position of poppet 22 in the insert 26 is continually adjusted to maintain the desired temperature by affecting gas flow. Pressure drop of the gas can be affected by varying the area between the fixed control surface and the variable control surface. For example, a larger pressure drop can be achieved by decreasing the area between the fixed control surface and the variable control surface, as compared to the previous position of the poppet. By affecting the gas flow to the burner means 48, the temperature output from the combustion device is directly affected.

Although a conical variable control surface 28 is illustrated, it will be obvious to those skilled in the art that a multitude of other geometric shapes can be used to provide the variable control surface, without departing from the scope of the invention. For example, a curved variable control surface can provide a slow fire up of gas flow as the poppet moves into the insert.

The temperature that is to be controlled is input to controller 16 by any suitable and commercially available electronic temperature sensing device 20, such as a thermistor, and serves as a feedback for changes in coil voltage, which in turn adjusts the amount of combustion gas exiting valve 12 through the control passage, or metering passage, comprised of the fixed control surface 34 of the poppet 22 and the variable control surface 28 of the insert element 26. This modifies the amount of heat produced by the gas until the demand temperature matches the temperature produced by the apparatus 10, within given tolerances.

The gas fuel flow control system and method according to the present invention is applicable for use in a variety of combustion devices such as an instantaneous water heating system, a thermostat-controlled air heating system, a gas stove, a gas grill, a grain dryer, or any other gas-fired appliance where control of temperature is important to the use or the end product of the appliance.

In a typical instantaneous water heating unit or air heating system, incoming cold water or air is heated by a burner means 48 as it travels through a heat exchanger. The resulting hot water or air then exits the heating unit at a hot water exit pipe or an air heating vent. Gas fuel such as propane flows through various units associated with the heater, including the variable orifice solenoid operated valve 12, to heat the incoming cold water or air. The variable orifice valve 12 responds to pre-set outlet water or air temperature conditions, based on the desired output water or air temperature, to maintain the desired water or air temperature at the outlet. Although a single variable orifice valve 12 can be used to control the gas fuel flow through the burner means 48, more than one variable orifice valve can be used if desired.

Changes in sensed and desired water and air temperature are adjusted for by the variable orifice solenoid valve 12. The valve 12 continually adjusts or controls the burner means 48 output in response to changes in the desired outlet water temperature. The changes can be caused by a variety of factors, including adjustment of the faucet or thermostat by a user, or the turning on or off of additional faucets or vents serviced by the same heating unit. Hence, the position of the valve is continually regulated responsive to the water or air temperature of the heating unit or combustion device.

Having described the invention in detail and by reference to preferred embodiments thereof, it will be apparent that other modifications and variations are possible without departing from the scope of the invention defined in the appended claims.

What is claimed is:

1. An apparatus for accurately controlling gas flow for a combustion device to maintain a desired outlet temperature, the apparatus comprising:

a. a variable orifice solenoid operated valve, the valve having a plurality of positions including a first position in which the valve is fully open and a second position in which the valve is fully closed, wherein minimum fuel flow is measured in the full closed position, the valve including a coil for receiving a voltage;

b. an insert element associated with the valve for allowing a specific amount of gas flow at a given voltage and for producing a repeatable gas flow as a function of coil voltage;

c. a popper for axially moving into and out of the insert element to control an amount of gas flow out of the valve.

2. An apparatus as claimed in claim 1 wherein maximum fuel flow is measured in the full open position.

3. An apparatus as claimed in claim 1 wherein the plurality of positions comprises a plurality of intermediate partially open positions for varying amount of fuel flow exiting the insert element.

4. An apparatus as claimed in claim 1 wherein a front end of the popper comprises a fixed control surface for affecting gas flow into the insert element.

5. An apparatus as claimed in claim 4 wherein the insert element comprises a variable control surface for receiving the fixed control surface of the poppet.

6. An apparatus as claimed in claim 5 wherein the variable control surface of the insert element comprises a dimensionally varying inner surface for interacting with the fixed control surface of the poppet.

7. An apparatus as claimed in claim 6 wherein the dimensionally varying inner surface comprises a conically narrowing surface.

* * * * *